United States Patent [19]
Dilly et al.

[11] Patent Number: 5,577,605
[45] Date of Patent: Nov. 26, 1996

[54] ROTARY SWITCH

[75] Inventors: Günter Dilly, Sarmsheim; Herrmann Mahr, Waldalgesheim; Gerd Rudolph, Aspisheim, all of Germany

[73] Assignee: Eaton Corporation, Cleveland, Ohio

[21] Appl. No.: 440,583

[22] Filed: May 15, 1995

[51] Int. Cl.⁶ ........................................................ H01H 19/14
[52] U.S. Cl. ............................ 200/564; 200/570; 200/571
[58] Field of Search ................................... 200/564, 565, 200/566, 567, 570, 571, 336, 11 R, 14, 11 A, 11 D

[56]    References Cited

U.S. PATENT DOCUMENTS

| 4,572,931 | 2/1986 | Shiraishi | 200/11 A |
| 4,719,324 | 1/1988 | Kuratani | 200/336 |
| 4,814,555 | 3/1989 | Armstrong et al. | 200/11 A |

Primary Examiner—David J. Walczak
Attorney, Agent, or Firm—Roger A. Johnston

[57]    ABSTRACT

Rotational switch, in particular gear box switches, comprising a housing carrying terminals (9), the housing being provided with fixed contacts (10) arranged concentrically with one another in two parallel planes (11,12), and a contact bridge (13) electrically connecting the fixed contacts (10), characterized in that, in each plane (11, 12) the fixed contacts (10) consist of at least one printed pattern (14) which patterns in each plane (11, 12) are sprayed on contact carriers (15) equipped with distancing pieces (17) and adapting elements (18). The contact carriers (15) cooperate with a contact module (16), and contact bridge (13) is held via spring loading in a switching member (22) which rotates in the housing (1). The contact bridge (13) thereby slides within the contact volume (2) formed by the distancing piece (17) of the contact carrier (15), over the exposed contact surfaces (21) of the printed pattern (14) which are oriented towards the contact volume (20).

The contact module (16) composed from the cooperating contact carriers (15) has an arcuate periphery with a frontal extension (25) which carries the terminal contacts (9). The distancing pieces (17) are located at the outermost arcuate path, at the lateral arcuate boundary (27) and in the vicinity of the frontal extension (25). The adapting elements (18) are formed on the distancing pieces (17).

12 Claims, 5 Drawing Sheets

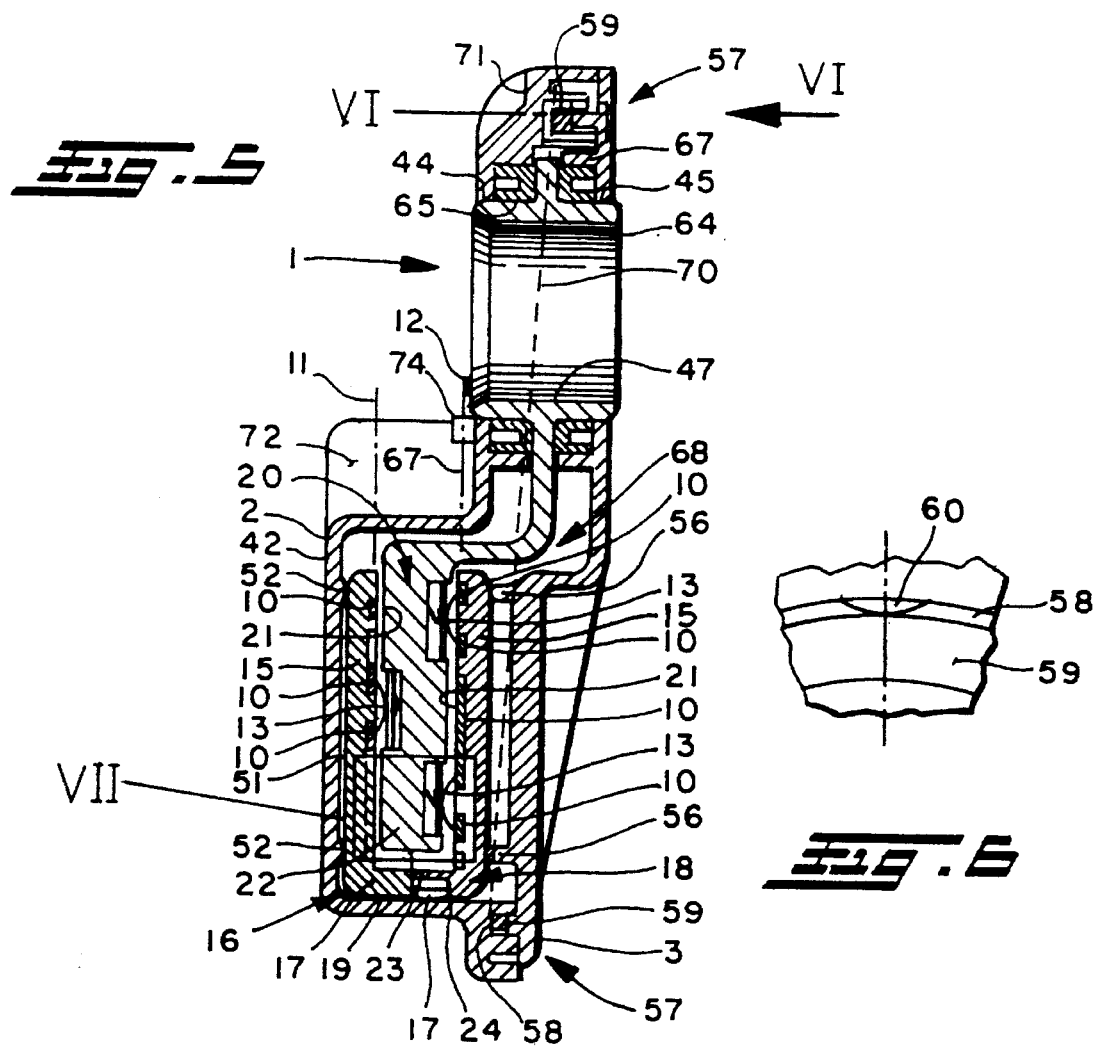
Fig.5
Fig.6
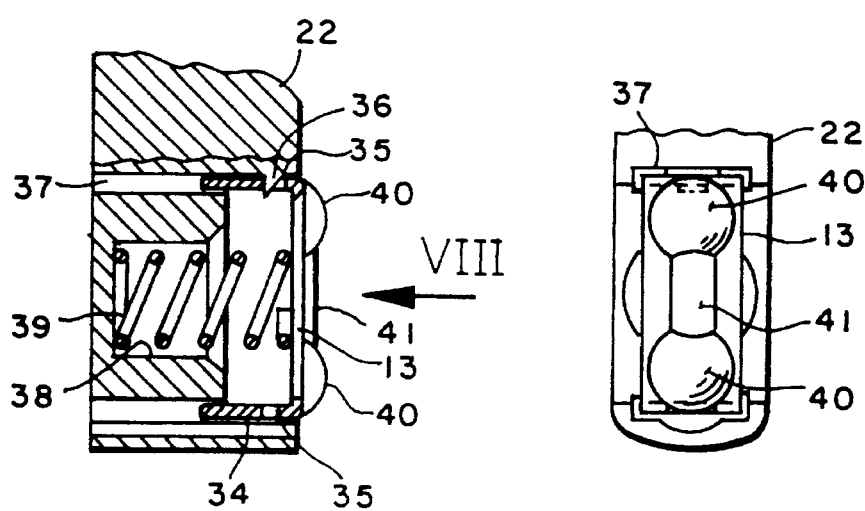
Fig.7
Fig.8

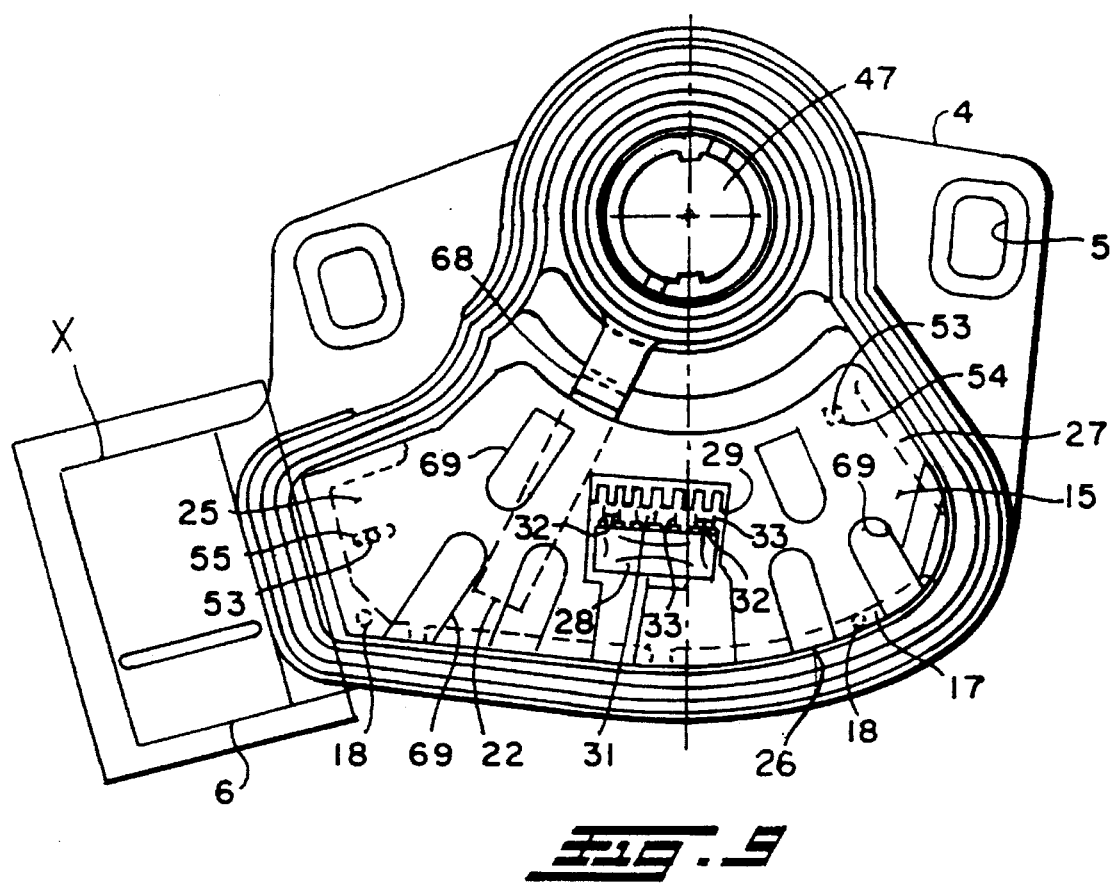
Fig. 9
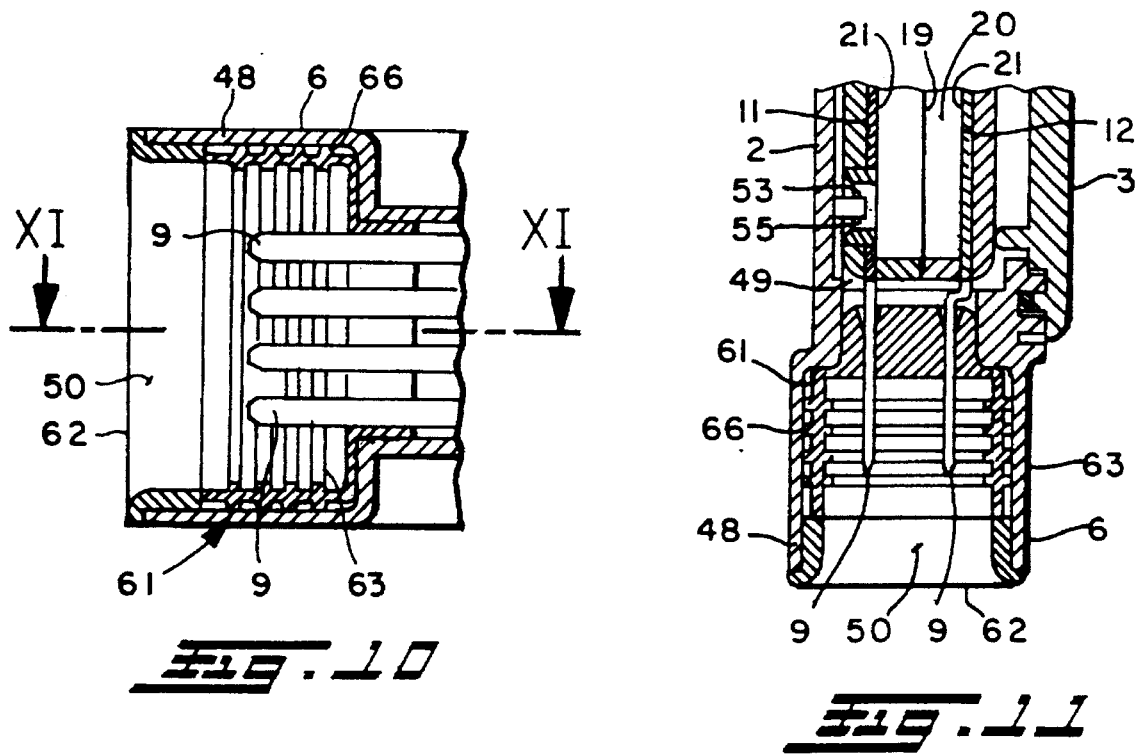
Fig. 10
Fig. 11

ROTARY SWITCH

BACKGROUND OF THE INVENTION

The invention concerns a rotary switch, notably a transmission switch, with a casing supporting connection contacts and in which there are provided, in two parallel planes, fixed contacts extending concentrically to one another and a contact bridge connecting the fixed contacts electrically.

Such a switch is known from German patent publication DE-OS 24 11 914. Fashioned as a casing on this rotary switch is a base with an annular projection. Arranged opposite the base is a cover of equal size that features an annular projection as well. Inserted in the annular projections of the base and cover is a ring with appropriate annular grooves. The cover and base are joined firmly, and the ring between both is rotatable. The seal relative to the switch interior is effected by way of the annular projections inserted in the annular grooves. Thus, the sealing elements are arranged on the outermost casing periphery, as a result of which a large area is present which needs to be sealed. The annular projection and annular groove need to be manufactured with a close tolerance relative to each other. Furthermore, temperature changes can easily cause distortion and binding of the ring between the cover and base. The annular projection needs to be fitted movably in the annular groove. Therefore, play—although slight—must always exist between mating elements. This play allows moisture to creep into the interior of the switch, resulting in corrosion and faulty switching. Fashioned as roll-shaped contact parts, the contact bridges are axially aligned under spring load in the ring and slide on arched edges of tall stamped tabs of sector or segment shape. The tabs are fabricated individually, inserted and fastened. The fastening and electrical connection are effected by way of metal screws provided with threading and an eyelet to which an electrical line can be connected. The internal structure of the base is adapted to the tabs, for which reason a modification of the wiring is not possible without expensive modification of the base. Since the contact bridge rests on the arched edges of the tabs, it is arranged in an area situated in the vicinity of the penetrating moisture, which results in increased susceptibility to malfunction. Each individual stamped tab must be fastened by itself; for one, in order to guarantee the electrical connection and, for another, to obtain a firm seating of the tabs. The space required for that purpose prevents an expansion by additional current paths needed. The tabs are arranged in two radial planes relative to one another. Contact is established only by way of the arched rims, leaving the space between the radial planes unused.

Moreover, German patent publication DE-AS 10 39 120 discloses an electrical switching appliance featuring a similar geometric structure with two casing parts fashioned as disks and joined by a hollow rivet with a ring fitted in between. The disks are inserted in a recess in the ring, and the existing maze labyrinth is meant to prevent the penetration of dust. Fastened at the bottom of a disk is a resistor on which, depending on the position of the disk, an appropriate value is switched. The connecting pins extend in axially parallel fashion out of the disk, must be manufactured as a separate part and, in addition to the connecting work, involve also an increased need for space. In case of excessive fastening pressure applied on the rivet, the disks deform easily with the result of excessive leakage in the area of the recess and also interference with the smooth sliding of the parts. This may even lead to a binding of the ring on the edges vaulted by the force.

The problem underlying the invention is to provide a rotary switch of the aforesaid type that features a compact, tight structure, adapts easily to variable current paths and capacities while permitting a plurality of current paths with a small number of separate parts.

SUMMARY OF THE INVENTION

This aforesaid problem is solved by the present invention in that the rotary switch has fixed contacts in each plane which consist of at least one stamped grid, molded per each plane in a contact carrier featuring spacing webs and mating elements. The contact carriers are combined to a contact module, with at least one spring-loaded contact bridge sliding in a switching member which is fitted concentrically and rotatably in the casing, in the contact space formed by the spacing webs of the contact carriers, on the exposed contact surface of the grids facing toward the contact space.

In this arrangement, only one part needs to be inserted per plane, and the spacing webs contained on the contact carrier ensure the correct height of the contact space, in that equal conditions of contact exist always for the contact bridge mounted on the switching member. The use of a stamped grid enables a large number of current paths. A new wiring pattern is obtainable by exchanging only one contact carrier of the contact module.

According to a favorable embodiment of the invention, the contact module composed of the contact carriers has the silhouette of a circular segment with a projection originating therefrom and supporting the contacts. The spacing webs are arranged on the outer circular segment track and the lateral segment boundary and in the area of the projection, with the mating elements being molded to the spacing webs. The resulting advantages are, for one, that only one area adapted to the swivel range of the switching member needs to be provided and, for another, that the projection given on the circular segment presents at the same time the contacts integrally with the grid. Furthermore, the contact space is shielded, the shielding taking place by the spacing webs and the mating elements being integrated in the spacing web, so that no additional construction height is required.

In accordance with the position of the rotary switch, a predetermined resistance value is incorporated in the current path, without enlarging the height of the contact module. To that end, a chamber is suitably recessed in the contact module, in which chamber a resistance network is inserted and electrically connected to welding tabs of the grid. A further feature of the invention is that the bottom surface of the chamber in the contact module is an incline on which the resistance network slides into the chamber, while stops protruding from the bottom surface fix the resistance network in a way such that the contact legs will be situated over the welding tabs of the grid. The resistance network is placed loosely in the chamber and slides on the incline up to the stops. In this position, the contact legs of the resistance network are located over the welding tabs of the grid, eliminating the need for additional fixing for the welding.

According to a favorable advancement of the invention, the switching member capable of swiveling in the contact module supports toward each contact surface of a contact carrier at least one spring-loaded contact bridge. This makes it possible to simultaneously close current paths on the contact carrier opposite the casing base and the contact carrier opposing the cover. Also, it is possible to establish a through contact from one contact carrier to the one opposing it, by means of appropriately fashioned contact bridges mounted in the switching member. In order to achieve a simple and quick assembly of both the individual parts on the switching member and of the switching member itself on the contact module, the contact bridge is suitably U-shaped, with a catch hole punched in at least one shank of the contact bridge, which hole is engaged upon insertion of the contact bridge in the switching member by a catch molded to the switching member and retaining the contact bridge under spring load with no risk of loss.

According to another favorable embodiment, the switching member and the casing accommodating the contact module consist of a casing base which accommodates the contact module in a recess, features mounting holes and a plug collar, and of a cover enclosing the casing base and presenting an adjustment slot. The casing base and the cover each have a coaxial hole in which a hub of the switching member is inserted rotatably that features means of entrainment. Thus, every opening in the rotary switch exists in only one plane, which facilitates the reliable seating of the rotary switch. The coaxial hole in the casing base and cover safeguards both the installation of the switching member hub and the alignment of the cover. To avoid additional sealing problems, the plug collar molded to the casing base and accommodating the contacts features preferably a surrounding, continuous rim, a duct to the recess and an access aperture for a plug.

A height alignment of the contact module and a non-rattling fixing of the upper contact carrier, in which context the contact module also is always compressed on its webs and the plug in the collar is at the same time symmetrically aligned, is achieved by providing, on the bottom of the recess in the casing base, alignment ribs on which the contact module is being seated. Pilot pins that engage appropriate pilot holes in the contact module are provided with fixing ribs provided on the recess cover toward the contact module. The pilot pins in the casing base safeguard the positional fixing of the contact module in the direction of the plug collar. A pilot pin interacts with a matching pilot hole, and the other pilot pin inserts for tolerance adjustment in a slot.

To prevent foreign bodies and moisture from penetrating into the interior of the switch, the casing base and the cover feature suitably mutually adapted, surrounding sealing shapes, with a metal ring inserted in a groove in the casing base, with casing base and cover joined by preferably induction welding. Inserted in the plug collar featuring the contacts is a sealing insert which surrounds the contacts and the interior of the plug collar under seal and is held in place by means of an annular cap, and an annular packing sealing the hole in the casing base. The hole in the cover is inserted in one each surrounding seat coordinated with the hub of the switching member. Thus, all places requiring sealing are hermetically sealed, each with a separate component. A mutual influencing of the sealing elements is thus precluded. The press fit in the plug collar additionally fixes the contacts. The metal ring in the groove in the casing base aids induction welding, and the sealing rings ensure a sound seal on the hub, with the switching member remaining easily rotatable.

In order to adapt to space limitations, a mounting plate of the casing base, which features a hole accommodating the hub of the switching member, is preferably aligned parallel to the bottom of the recess, and the switching member features a Z-step between the hub and the area holding the contact bridges.

Another favorable provision is that the surrounding sealing shapes are situated in a plane between casing base and cover. This facilitates induction welding of casing base and cover. Furthermore, fabricating the metal ring as a flat part is considerably simpler.

In order to provide the same pressure in the interior of the switch and on the outside of the rotary switch, a plug permeable to air is provided according to a favorable embodiment, in the plane between casing base and cover. In order to assure pressure equalization, this plug is air-permeable in both directions, but is impermeable to solid or liquid substances. In the area of the sealing shape, the casing base features preferably, toward the switch interior, a ventilation slot; and, between the outside of the rotary switch and the plug, a ventilation hole is provided, while on the cover there is a tower provided — with a ventilation groove—that effects the interference fit of the plug. The plug is suitably made of a sintered material, which readily allows elastic deformation of the plug with a tight fit between casing base and cover.

For easy mounting of the rotary switch, a flute facilitating adjusted screw is preferably molded to the mounting plate of the casing base.

The invention will be more fully explained in the following description with the aid of an embodiment illustrated in the drawing.

BRIEF DESCRIPTION OF THE DRAWINGS

FIG. 5 a section through the rotary switch according to FIG. 2, along line V—V;

FIG. 6 an enlarged illustration of the detail VI viewed in the direction of arrow VI according to FIG. 5;

FIG. 7 scaled up, a detail of VII in FIG. 5;

FIG. 8 a plan view of FIG. 7 according to arrow VIII;

FIG. 9 a plan view of the rotary switch according to FIG. 1, but without cover;

FIG. 10 detail X according to FIG. 9;

FIG. 11 a section through FIG. 10 along line XI—XI; and,

DETAILED DESCRIPTION

Figure 1:
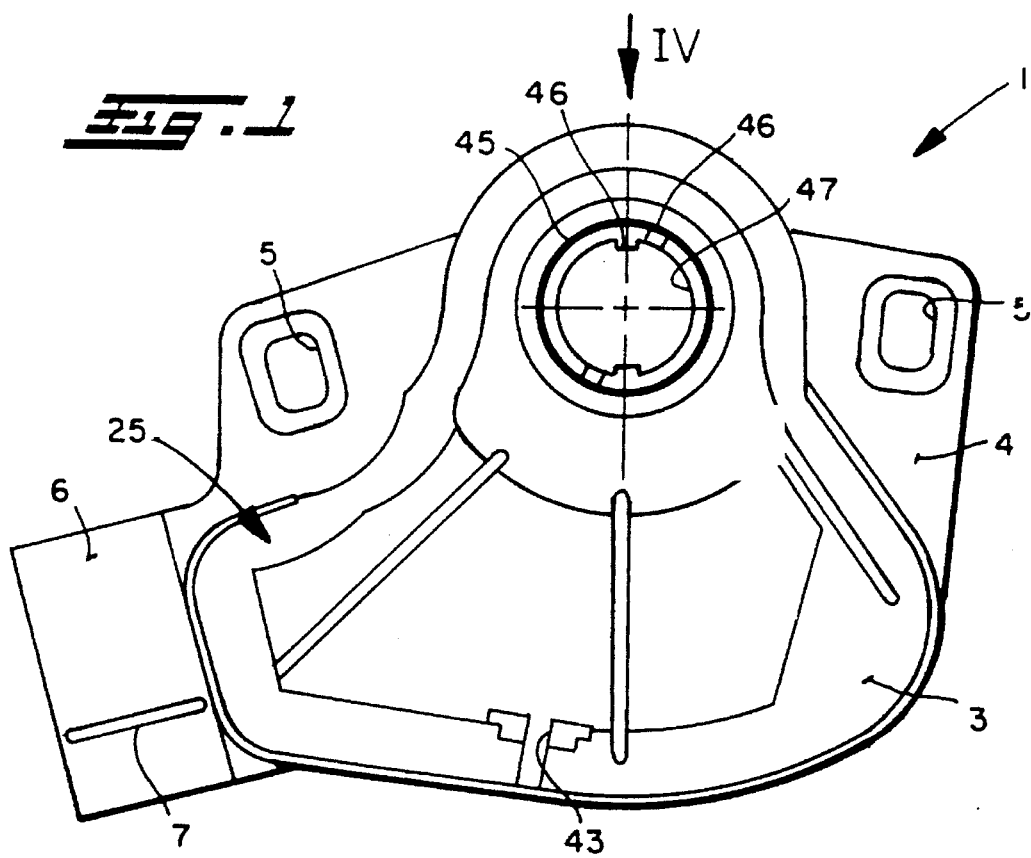
FIG. 1 shows a view of a rotary switch according to the invention.
Figure 2:
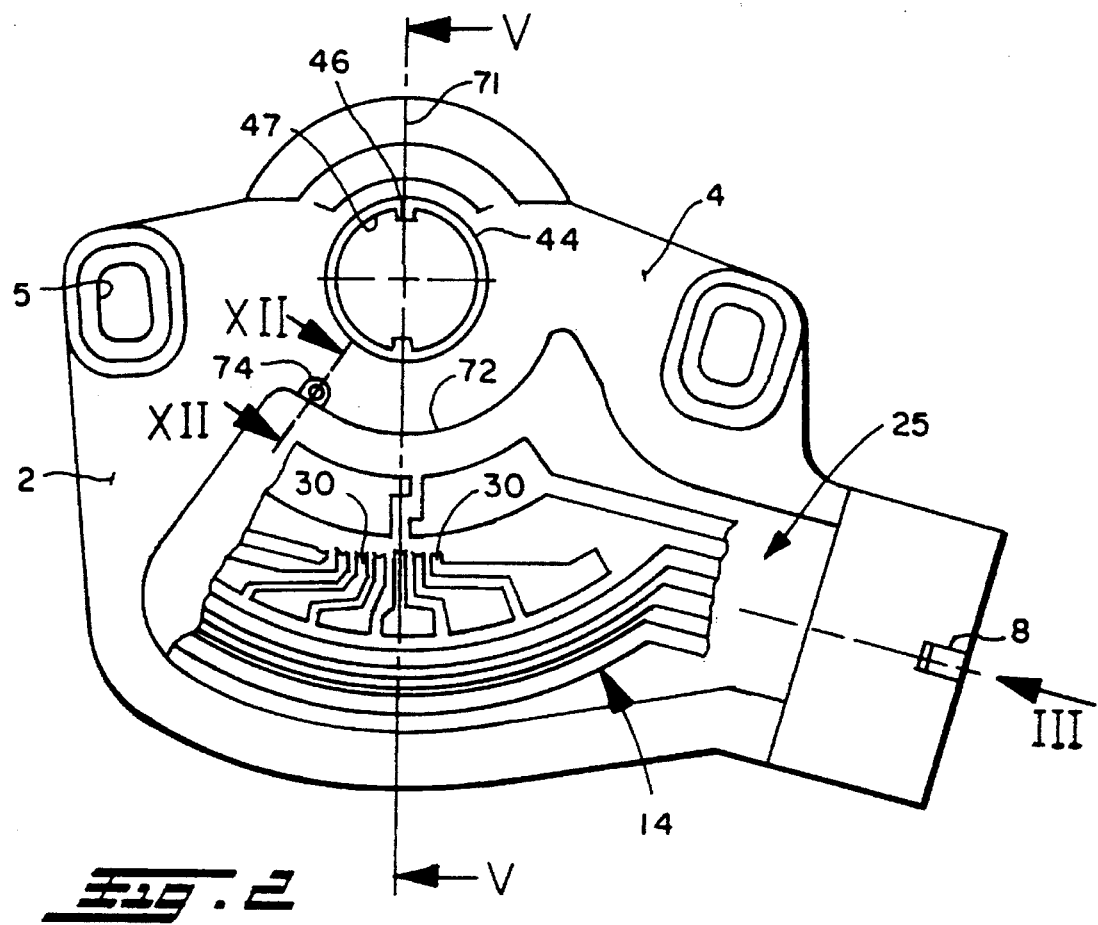
FIG. 2 a rear view of the rotary switch relative to FIG. 1, with a cutaway to illustrate the grid.
Figure 3:
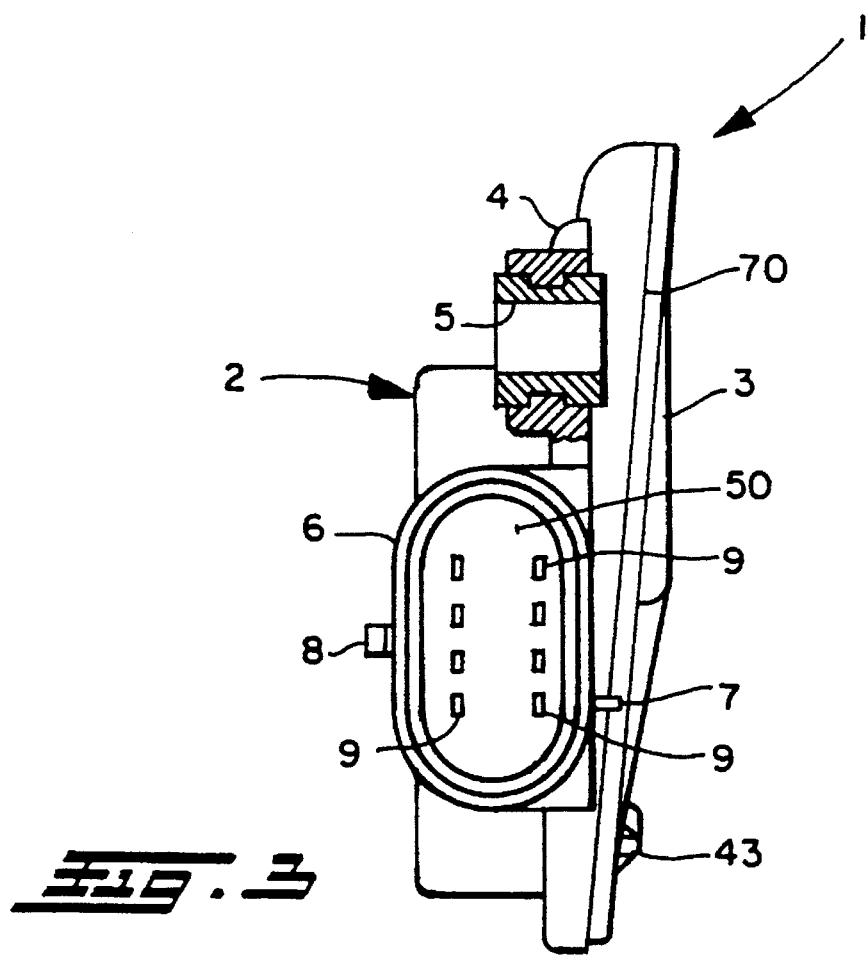
FIG. 3 a view in the direction of arrow III in FIG. 2.

Referring to the drawings, the casing indicated generally at 1 of the rotary switch consists essentially of the casing base 2 and cover 3. Contained on the casing base 2 is the integrally formed mounting plate 4 with essentially rectangular screw holes 5. Molded integrally to the casing base is also the electrical plug collar or receptacle 6 with a pilot rib 7 and catch 8 for non-interchangeable and safe mounting of a connector plug (not illustrated). Protected against external touch, the electrical terminals or contacts 9 protrude within the collar 6 at a fixed pitch. Provided in the casing 1, in two parallel planes 11, 12 are fixed contacts 10, which are electrically interconnected by contact bridges 13. The fixed contacts 10 in each of the planes 11, 12 consist of at least one stamped grid 14. The grids are molded, per plane 11, 12, in a contact carrier 15. The contact carriers 15 are combined to a contact module 16. For that purpose, the contact carriers 15 feature spacing webs 17 and mating elements 18. The contact carriers 15 butt on one another with the end faces 19 of the spacing webs 17, forming between themselves the contact space 20. The mating elements 18 on the spacing webs 17 consist of a pin 23 and a hole 24. The contact surface 21 of the grids is exposed in the interior of the contact space 20 of the contact module 16. Supporting the contact bridges 13, the switching member 22 swivels freely in the contact space 20. The contact member 22 is fitted rotatably in the casing 1, concentric with the grid 14. In the area of the contact carriers 15 swept by the switching member 22, the contact module 16 has the silhouette of a circular segment. In variation thereof, contact module 16 composed of the contact carriers 15 features a projection 25 that supports the contacts 9. The spacing webs 17 are arranged on the outer annular segment track 26, on the lateral segment boundary 27 and in the area of projection 25. Two mating elements 18 are molded to the spacing webs 17.

A contact carrier 15 of the contact module 16 supports a resistance network 28. For that purpose, a chamber 29 is recessed in the side of the contact carrier 15 away from the contact surface 21. The depth of chamber 29 is such that parts of the grid 14 fashioned as welding contacts 30 are exposed for welding the resistance network 28 to them. The bottom surface 31 of the chamber 29 in the contact module 16 forms an incline, and stops 32 protrude out of the bottom surface 31. When placed in the chamber, the resistance network 28 slides on the incline into the chamber up to the stops 32. These are so fashioned that the contact legs 33 of the resistance network 28 will be situated over the welding contacts 30 of the grid 14, making an additional fixing for the welding operation dispensable. The swiveling switching member 22 is being moved within the contact space 20 of the contact modules 16. The grid 14 represents the contact surface 21 of each contact carrier 15. On its near side relative to the cover 3, the switching member 22 has three spring-loaded contact bridges 13. On its side facing toward the casing base 2, the switching member 22 has one spring-loaded contact bridge 13. The switching member 22 features recesses 37 into which the U-shaped contact bridge 13 is inserted. The switching member 22 features a blind hole 38 which is concentric with the contact bridge 13 and in which bears the compression spring 39, forcing the contact bridge 13 toward the contact surface 21. A catch hole 35 is punched in the shanks 34 of the contact bridge 13. With the contact bridge inserted in the recess 37 in the switching member 22, a catch 36 molded to the contact member 22 engages the catch hole 35, retaining the spring loaded contact bridge 13 safe from loss. The contact bridge 13 possesses two contact bosses 40 with which it glides on the contact surface 21 of the contact carrier 15. For reinforcement of the contact bridge 13, an embossing 41 is provided between the contact bosses 40. Featuring the mounting holes 5 in its mounting plate 4, the casing base 2 has a hollow 42 recessed into itself for insertion of the contact module 16 which accommodates the switching member 22. Plug collar 6 is also integrally molded to the casing base 2. Provided with an adjustment slot 43, the cover 3 closes the casing base 2. The latter and the cover 3 feature each a coaxial hole 44, 45 in which the hub 47 of the switching member 22 is fitted rotatably. In its interior, the hub 47 of the switching member 22 possesses drivers 46 with which the switching member 22 is set to the appropriate position of swivel.

The plug collar 6 accommodating the contacts 9 is provided with a surrounding, continuous rim 48, a conduit 49 to the recess 42 in the casing base 2, and a plug-in aperture 50 for a not illustrated plug.

Alignment ribs 52 are fashioned in the recess 42 of the casing base 2. The contact module 16 bears on these alignment ribs. Protruding from the bottom 51, pilot pins 53 engage matching pilot holes 54, 55 in the contact module 16. One pilot hole 55 is slotted so as to obtain an equalization of tolerance with the contact module 16.

Arranged on the inside of the cover 3, opposite the recess 42 and in the direction of the contact module 16, are fixing ribs 56. With the cover 3 closed, said fixing ribs 56 push the contact module 16 onto alignment ribs 52, thereby clamping the contact module 16 in place and establishing an axial fixing. A perpendicular fixing is effected through the pilot pros 53 in conjunction with pilot holes 54 and 55.

The casing base 2 and cover 3 feature sealing shapes 57 that are adapted to each other and engage each other. A metal ring 59 is inserted in a groove 58 in the casing base 2. The metal ring 59 has a rectangular cross section and is adapted to the surrounding shape of the cover 3, or casing base 2. Adapter lugs or knobs 60 are molded to the groove 58 for fixing the metal ring 59. Once inserted in the groove 58, the metal ring 59 is thus free of play. With the equipped contact module 16 inserted in the recess 42 of the casing base 2, cover 3 and casing base 2 are welded and preferably induction-welded, establishing a moistureproof and dust-proof joint of the casing 1.

Referring to FIGS. 10 and 11, inserted in the plug collar 6 of the casing base 2, in the interior 61 of the plug collar 6, is a sealing insert 63 which under seal wraps around the contacts 9. An annular cap 62 retained by interference fit forces the sealing insert 63 firmly into the interior area 61, with the lips 66 establishing a seal along the surrounding rim 48. Forcing the insert 63 in place reinforces the already sealing wraparound of the contacts 9.

Referring to FIG. 5, a seat 64 for an annular seal 65 is provided on both sides of the hub 47 of the switching member 22. Coordinated with each seat 64 is a surrounding ring 67, on the casing base 2 and cover 3. When joining the casing base 2 to the cover 3 with the hub 47 of the switching member 22 in between, the sealing ring 65 bears on the seat 64 and the surrounding ring 67 under seal. The area of the mounting plate 4 in which the hole 44 in the casing base 2 is made for accommodation of the hub 47 of the switching member 22 is in parallel alignment with the bottom 51 of the recess 42. A Z-step 68 between hub 47 and the area of the switching member 22 that holds the contact bridges 13 bridges the parallel offset between the coaxial holes 44, 45 and the contact module 16 fitted in the recess 42. For material saving and low-distortion mounting of the grids 14, grooves 69 are recessed, in the molding operation, in the contact carrier 15 of the contact module 16, on the side opposite the contact surfaces 21.

The parting line between casing base 2 and cover 3 is fashioned such that the surrounding sealing shapes 57 are situated in a plane 70 as shown in dashed line in FIG. 5.

Figure 12:
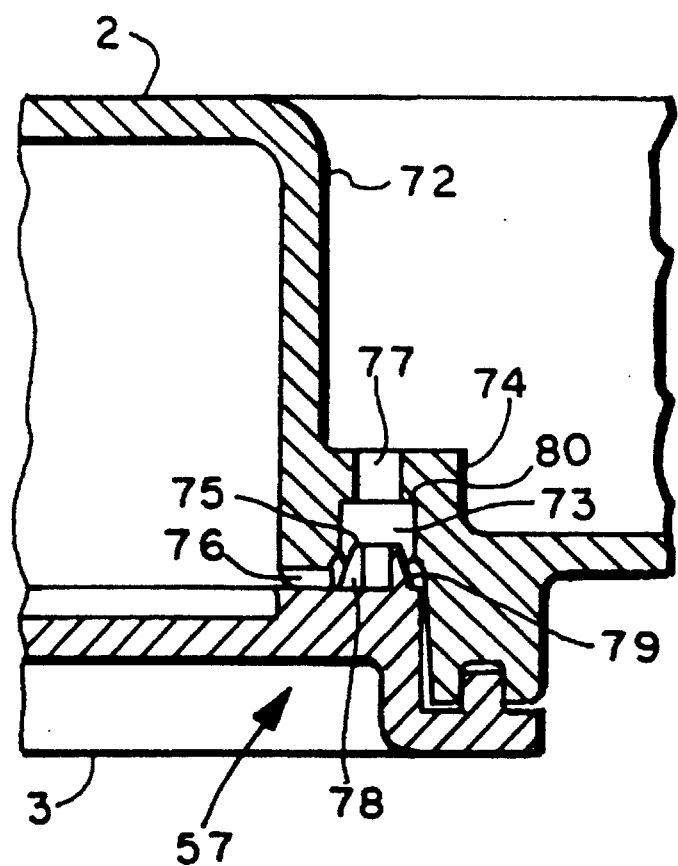
FIG. 12 scaled up, a section along line XII—XII according to FIG. 2.

Referring to FIG. 12, an air-permeable plug 73 is clamped in place in the corner area between the mounting plate 4 and the wall 72 enclosing the contact module 16, between the casing base 2 and cover 3. The plug 73 is located in the plane 70 of the surrounding sealing shapes 57. In order to allow sufficient material for the plug, a projection 74 is molded to the casing base 2; and, it accommodates the plug 73 in a seat 75. A ventilation hole 77 extends from the shoulder 80 of the seat 75 to the exterior of the switch. Furthermore, a ventilation slot 76 is fitted in the sealing shape 57, through which the pressure level of the switch interior prevails on the inside of the plug 73. The cover 3 supports a tower 79 that forces the plug 73 on the seat 75. The tower 73 has a ventilation groove 78 in order to make a maximally large exposed surface available for pressure equalization. The plug 73 is made of a sintered material which is permeable to air, or gas, and elastic to a degree such that a playless, tight squeeze can be obtained.

Figure 4:
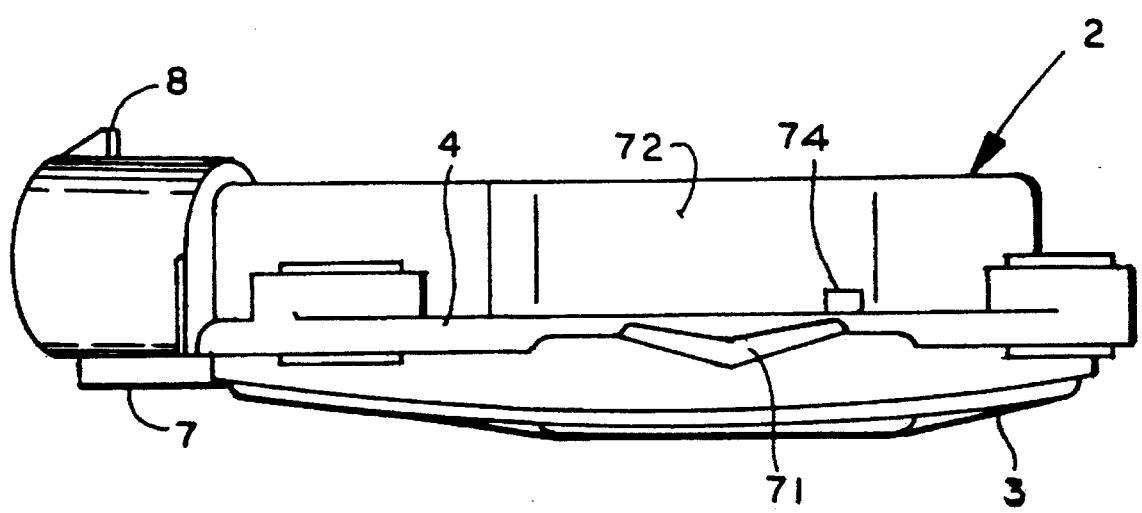
FIG. 4 a view in the direction of arrow IV relative to FIG. 1.

Referring to FIGS. 4 and 5 an obtuse-angled flute 71, coordinated with the mounting plate 4, is molded in the casing base 2. This flute 71 effects an automatic adjustment of the casing I of the rotary switch in mounting.

Although described with respect to the embodiment shown in the drawings, the invention may be modified and varied within the scope of the following claims.

We claim:

1. A rotary switch comprising:
   (a) a casing adapted for attachment to stationary structure;
   (b) a rotor disposed for pivotal movement on said casing, said rotor having at least one spring biased bridging contact thereon for movement therewith;
   (c) a removable contact carrier disposed and located in said casing, said carrier having at first and second spaced planar arrays of stationary contacts, said carrier having a generally U-shaped configuration in transverse section wherein said at least one contact bridge wipes on at least one of said arrays upon said pivotal movement.

2. The switch defined in claim 1 wherein said stationary contacts have portions integrally formed therewith and extending externally of said carrier and said casing for external connection thereto.

3. The switch defined in claim 1 wherein said bridging contact is slidably received in said rotor.

4. The rotary switch defined in claim 1 wherein said rotor has portions thereof adapted for being received on a shaft.

5. The rotary switch defined in claim 1 wherein said rotor has a hub portion journalled on said casing means.

6. The rotary switch defined in claim 1 wherein said casing means includes a base shell and a cover shell releasably attached thereto and retaining said carrier therein.

7. The rotary switch defined in claim 1 wherein said stationary contacts have portions thereof extending outwardly of said carrier and extending through said casing and exteriorly thereof.

8. The rotary switch defined in claim 1 wherein said carrier includes a first and second shell portion joined along a parting line in the closed end of said U-shape.

9. The rotary switch defined in claim 1 wherein bridging contact is molded with a catch and thereby spring locked in said rotor.

10. The rotary switch defined in claim 1 wherein said casing means includes portions thereof moveably sealed about said rotor.

11. The rotary switch defined in claim 10, further comprising a ventilation hole.

12. The rotary switch defined in claim 1 wherein said stationary contact in at least one of said first and second arrays have portions thereof extending from said carrier and outwardly of said casing; and, further comprising seal means for sealing said portions extending outwardly of said casing.

* * * * *